United States Patent
Wang et al.

(10) Patent No.: US 10,621,482 B2
(45) Date of Patent: Apr. 14, 2020

(54) GRAPHIC TWO-DIMENSIONAL BARCODE AND CREATING METHOD THEREOF

(71) Applicant: NATIONAL TAIWAN NORMAL UNIVERSITY, Taipei (TW)

(72) Inventors: Hsi-Chun Wang, Taipei (TW); Chun-Shien Lu, Taipei (TW); Pei-Chun Kuan, Taipei (TW); Chia-Tsen Sun, Taipei (TW); Yu-Mei Wang, Taipei (TW); Jong-Kai Lee, Taipei (TW)

(73) Assignee: National Taiwan Normal University, Taipei (TW)

( * ) Notice: Subject to any disclaimer, the term of this patent is extended or adjusted under 35 U.S.C. 154(b) by 0 days.

(21) Appl. No.: 16/249,242

(22) Filed: Jan. 16, 2019

(65) Prior Publication Data
US 2020/0074255 A1    Mar. 5, 2020

(30) Foreign Application Priority Data
Aug. 31, 2018 (TW) .............................. 107130692 A

(51) Int. Cl.
*G06K 19/06* (2006.01)
*G06K 1/12* (2006.01)

(52) U.S. Cl.
CPC ........ *G06K 19/06103* (2013.01); *G06K 1/121* (2013.01); *G06K 19/06037* (2013.01)

(58) Field of Classification Search
CPC ...... G06K 7/1417; G06K 19/00; G06K 19/04; G06K 19/06; G06K 19/06037; G06K 19/06046

USPC ............ 235/494, 454, 462.09, 462.1, 462.25
See application file for complete search history.

(56) References Cited

U.S. PATENT DOCUMENTS

| | | | | |
|---|---|---|---|---|
| 6,460,766 B1 * | 10/2002 | Olschafskie | ....... | G06K 7/10881 235/453 |
| 6,572,025 B1 * | 6/2003 | Nishikado | .............. | G06K 1/123 235/462.09 |
| 7,104,449 B2 * | 9/2006 | Han | ..................... | G06K 19/045 235/454 |
| 2012/0087538 A1 * | 4/2012 | Cvetkovic | ............ | G02B 27/027 382/100 |

(Continued)

*Primary Examiner* — Daniel St Cyr
(74) *Attorney, Agent, or Firm* — Muncy, Geissler, Olds & Lowe, P.C.

(57) ABSTRACT

A method of creating a graphic Quick Response (QR) code includes a picture and first and second two-dimensional barcodes combined through a halftoning technique. The graphic QR code includes a plurality of module units, each having a plurality of sub-modules. Information dots containing first information for the first two-dimensional barcode are provided, and each of the information dots of the first two-dimensional barcode is located at a central sub-module of each of the module units. The first information is readable by a scanning device. Information dots containing second information for the second two-dimensional barcode are provided, and each of the information dots of the second two-dimensional barcode is located at one of the other sub-modules. A position of each of the information dots of the second two-dimensional barcode is capable of being located by inputting a key through a decryption program for obtaining the second information.

12 Claims, 5 Drawing Sheets

(56) References Cited

U.S. PATENT DOCUMENTS

2015/0324946 A1\* 11/2015 Arce .................. G06T 1/0021
382/251
2016/0088181 A1\* 3/2016 Chen .................. H04N 1/405
358/2.1

\* cited by examiner

GRAPHIC TWO-DIMENSIONAL BARCODE AND CREATING METHOD THEREOF

BACKGROUND OF INVENTION

1. Field of Invention

The present invention relates to a two-dimensional barcode, and particularly to an encrypted graphic two-dimensional barcode and creating method thereof.

2. Related Art

With tremendous development of network communication and popular use of mobile devices, information is not only disseminated fast but also obtained easily. Two-dimensional barcodes are most widely used as a significant interface to deliver information between reality and virtual world. The most well known two-dimensional barcodes are Quick Response codes (QR codes) and are capable of storing much data.

QR codes play an important role in marketing advertisement and transactional payment and are closely tied with our daily lives. For example, QR codes provided on fliers or posters can be scanned by cameras of mobile devices (e.g., smart phones) to allow users to access a website which is linked by the QR codes and displayed on screens of the mobile devices to obtain information. However, because of the convenience that QR codes are capable of rapidly providing information for users, QR codes are misappropriated and forged by some fraudulent users. For example, QR codes can be used for users' identification, or to enable direct access to a certain website as predetermined by dealers. In this manner, fraudulent users deliberately misuse QR codes for the purpose of personal benefits by taking the deficiency of no anti-counterfeit function of QR codes. Furthermore, traditional two-dimensional barcodes are not recognizable to human vision and not changeable in patterns due to unique barcode structure, thereby failing to provide aesthetically pleasing features. Therefore, it is imperative to improve traditional two-dimensional barcodes to be both aesthetically pleasing and anti-counterfeit.

SUMMARY OF INVENTION

Accordingly, an object of the present invention is to provide a graphic two-dimensional barcode containing hidden information, which is only capable of being obtained by input of a key, to be anti-counterfeiting as well as aesthetically pleasing with its explicit cover image.

Another object of the present invention is to provide a method of creating a graphic two-dimensional barcode, utilizing two layers of two-dimensional barcodes in combination with a picture to form the graphic two-dimensional barcode of which hidden information is only capable of being obtained by input of a key to strengthen the anti-counterfeiting features.

To achieve the above-mentioned object, a method of creating a graphic two-dimensional barcode, comprising: providing a picture, a first two-dimensional barcode, and a second two-dimensional barcode; combining, utilizing a halftoning technique by error diffusion, the first two-dimensional barcode and the second two-dimensional barcode with the picture to form a graphic two-dimensional barcode including the first and second two-dimensional barcodes and the picture, the graphic two-dimensional barcode including a plurality of module units, each of the plurality of module units comprising a plurality of sub-modules; providing information dots containing first information for the first two-dimensional barcode, each of the information dots of the first two-dimensional barcode located at a central sub-module of the plurality of the sub-modules of each of the module units, wherein the first information is readable by scanning the information dots of the first two-dimensional barcode through a reader device; and providing information dots containing second information for the second two-dimensional barcode, each of the information dots of the second two-dimensional barcode located at one of the other sub-modules of each of the module units, wherein a position of each of the information dots of the second two-dimensional barcode is capable of being located by inputting a key through a decryption program for obtaining the second information.

In one aspect of the present invention, each of the module units has 3×3 of the sub-modules disposed in a matrix arrangement, and each of the information dots of the first two-dimensional barcode is located at a central location of the 3×3 sub-modules.

In one aspect of the present invention, each of the information dots of the second two-dimensional barcode is located at the other sub-modules of each of the module units surrounding the central location of the 3×3 sub-modules.

In one aspect of the present invention, after being inputted the key, the decryption program produces a pseudo-random number having a coding sequence length to calculate the position of each of the information dots of the second two-dimensional barcode containing the second information.

In one aspect of the present invention, the decryption program is performed by utilizing the pseudo-random number having the coding sequence length which is also used in the encryption by error diffusion algorithm based on the halftoning technique, and to obtain the position of each of the information dots of the second two-dimensional barcode.

In one aspect of the present invention, the graphic two-dimensional barcode further comprises at least three control points, and the decryption program is configured to perform steps comprising: sampling an image of the graphic two-dimensional barcode by locating the at least three control points; converting the image being obtained into a bi-level image; locating the information dots contained in the graphic two-dimensional barcode by calculation; comparing the locations of the plurality of sub-modules of the module units with an original image data of the graphic two-dimensional barcode for acquiring locations of the sub-modules that are not corresponding to the original image data; and obtaining the second information by inputting the key through the decryption program.

In one aspect of the present invention, the first two-dimensional barcode and the second two-dimensional barcode are quick response (QR) codes.

The present invention further provides a graphic two-dimensional barcode, comprising: a picture, a first two-dimensional barcode, and a second two-dimensional barcode, the first two-dimensional barcode and the second two-dimensional barcode combined with the picture though a halftoning technique by error diffusion; a plurality of module units disposed on the graphic two-dimensional barcode, each of the plurality of module units comprising a plurality of sub-modules; information dots containing first information disposed in the first two-dimensional barcode, each of the information dots of the first two-dimensional barcode located at a central sub-module of the plurality of the sub-modules of each of the module units; and information dots containing second information disposed in the second two-dimensional barcode, each of the information dots of the second two-dimensional barcode located at one of the other sub-modules of each of the module units, and wherein a position of each of the information dots of the second two-dimensional barcode is capable of being located by inputting a key through a decryption program, thereby to obtain the second information.

The graphic two-dimensional barcode of the present invention utilizes two-layer QR codes in combination with an explicit cover image to achieve the purpose of hiding information and to necessitate inputting the key to obtain the second information contained in the second two-dimensional. Therefore, the graphic two-dimensional barcode of the present invention is aesthetically pleasing as well as enhancing the anti-counterfeiting features, and effectively overcomes the problem of illegally use and misappropriation.

DESCRIPTION OF PREFERRED EMBODIMENTS

The present invention provides a graphic two-dimensional barcode and a creating method thereof. In this preferable embodiment, the graphic two-dimensional barcode is a Quick Response code (QR code), which is applicable to many aspects in daily life, for example, such as marketing advertisement, transactional payment, education learning, identification verification, or logistics management. By utilizing QR codes to link reality with the virtual world, information can be rapidly and efficiently disseminated in an anti-counterfeit manner, thereby to prevent information from being illegally obtained and misused.

Figure 1:
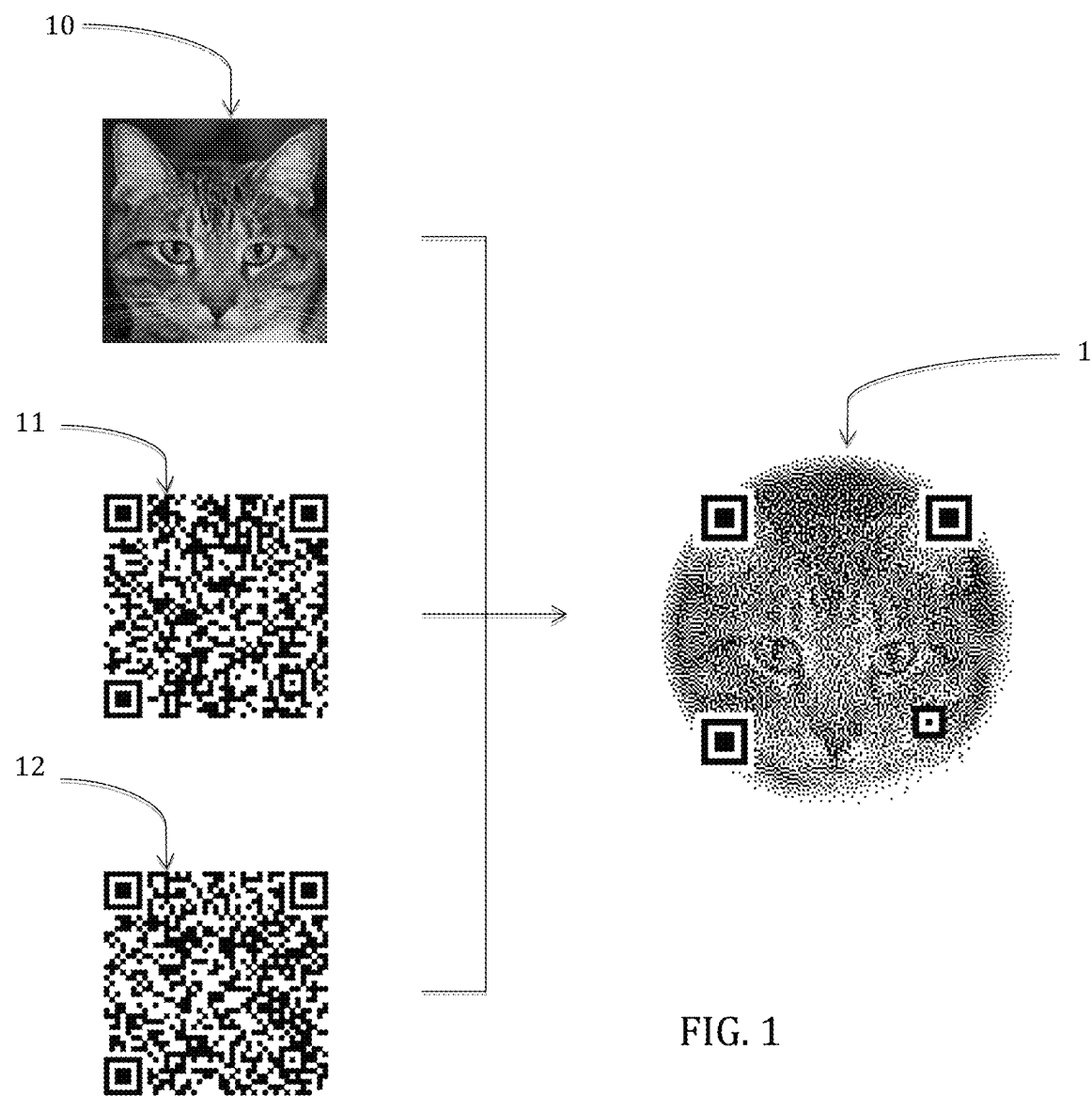
FIG. 1 is a schematic exploded view of a graphic two-dimensional barcode of the present invention.
Figure 2:
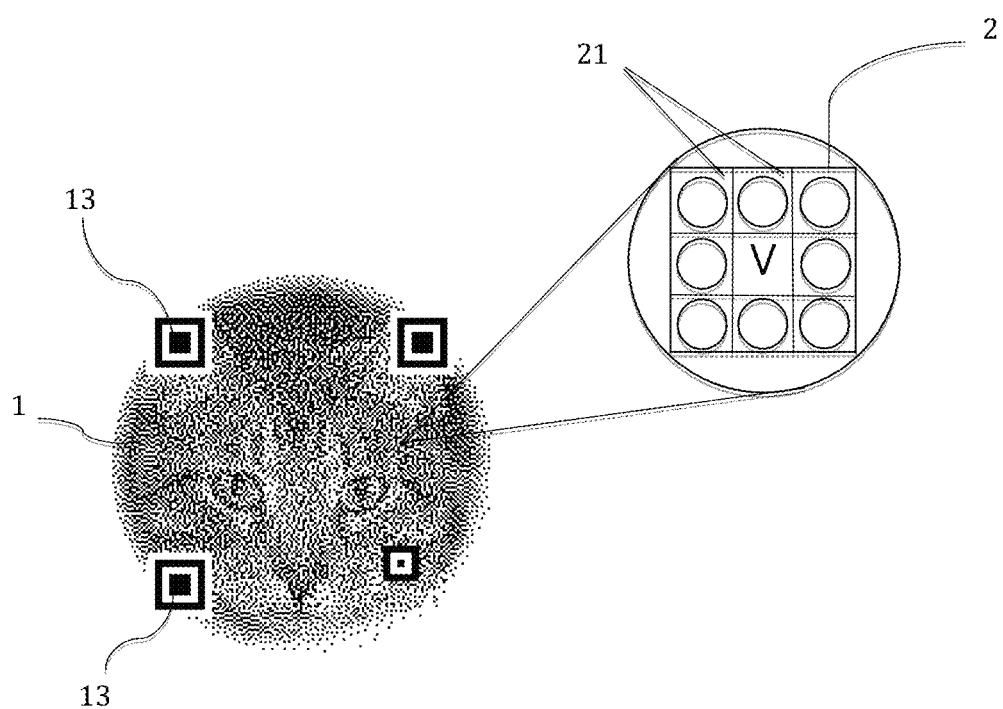
FIG. 2 is a schematic assembly view of FIG. 1.
Figure 3:
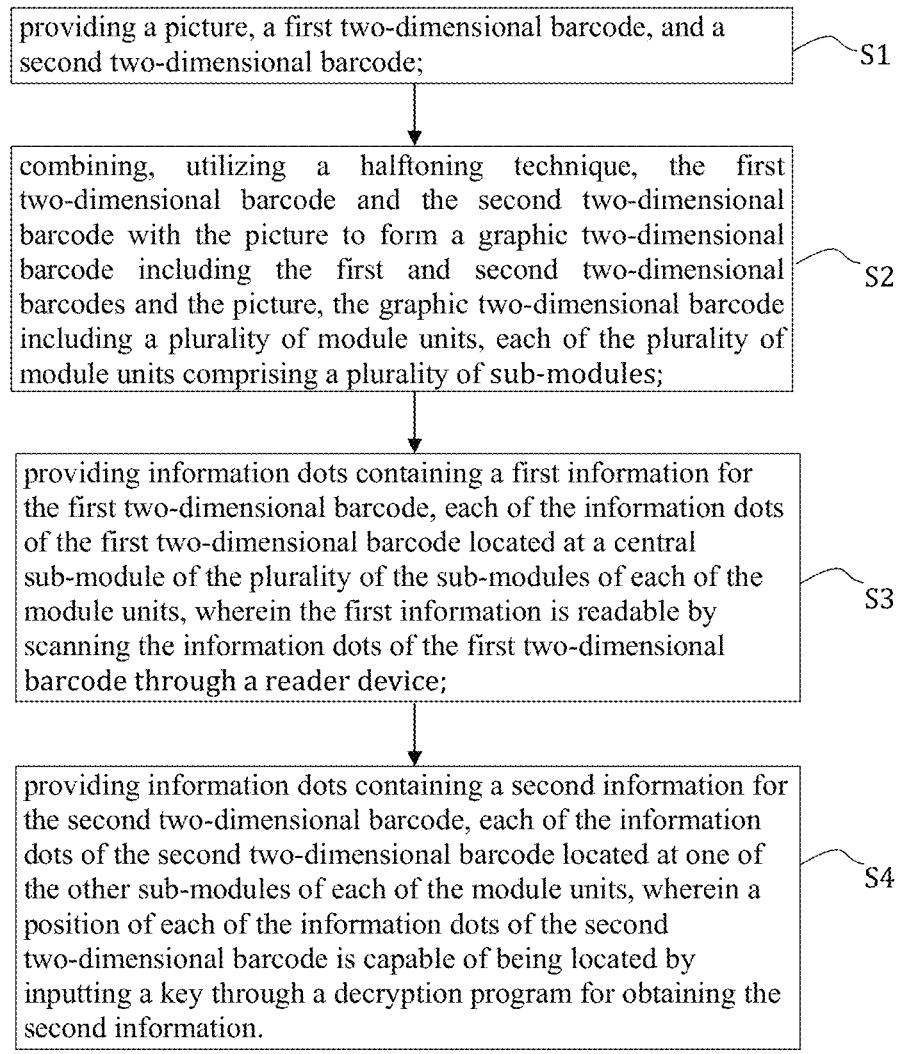
FIG. 3 is a flow chart showing a method of creating the graphic two-dimensional barcode of the present invention.

Please refer to FIG. 1 showing a schematic exploded view of a graphic two-dimensional barcode, FIG. 2 showing a schematic assembly view of FIG. 1, and FIG. 3 showing a flow chart of a method of creating the graphic two-dimensional barcode of the present invention. The method of creating a graphic two-dimensional barcode of the present invention includes steps as follows: step S1: providing a picture 10, a first two-dimensional barcode 11, and a second two-dimensional barcode 12. Specifically, the picture 10, the first two-dimensional barcode 11, and the second two-dimensional barcode 12 are first input in a computer (not shown) or other media device, wherein the picture 10 can be words or figures, or a combination of words and figures, forming an explicit cover image for promotion, business image identification, and beautifying two-dimensional barcodes. Both of the first two-dimensional barcode 11 and the second two-dimensional barcode 12 are QR codes.

Step S2: combining, utilizing a halftoning technique, the first two-dimensional barcode 11, the second two-dimensional barcode 12, and the picture 10 to form a graphic two-dimensional barcode 1 including the first and second two-dimensional barcodes 11 and 12 and the picture 10.

Digital halftoning is a technique utilized to convert continuous tone images into bi-level images using a halftoning algorithm to meet the characteristics of output equipment, in which size or intensity of dots is adjustable to simulate continuous tone images. Simulative continuous tone images are created as a blurred image to human eyes when a halftone image is seen at a certain distance, in such a way that adjacent dots of the halftone image are integrated by an analogous low-pass filter, rendering the adjacent dots continuous to human eyes.

Particularly, the graphic two-dimensional barcode of the present invention includes a plurality of module units 2, each of the plurality of module units 2 has a plurality of sub-modules 21 (as shown in FIG. 2). In this embodiment, the present invention takes version six of QR codes including 41×41 the module units 2 for calculation base. Each of the module units 2 has 3×3 of the sub-modules 21 disposed in a matrix arrangement. In other words, each of the module units 2 has nine sub-modules 21.

Figure 5:
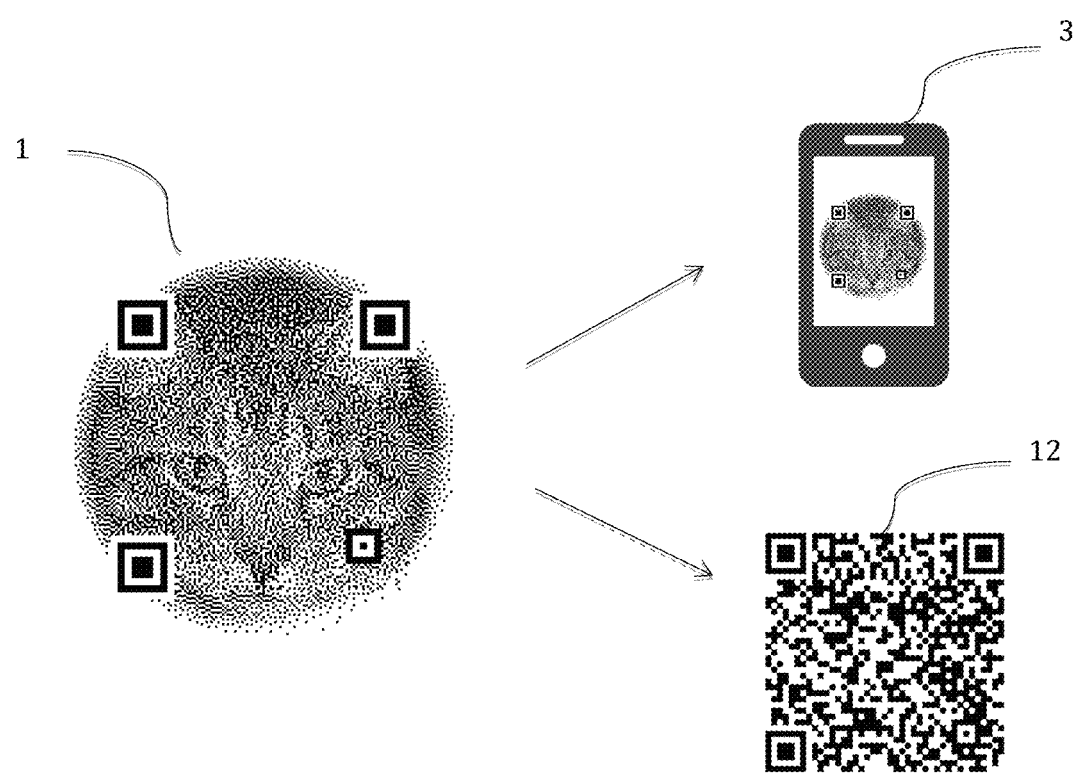
FIG. 5 is a schematic view showing the graphic two-dimensional barcode of the present invention is being read.

Step S3: provide information dots containing first information for the first two-dimensional barcode 11, and each of the information dots of the first two-dimensional barcode 11 is located at a central sub-module 21 of the plurality of the sub-modules 21 of each of the module units 2, wherein the first information is readable by scanning the information dots of the first two-dimensional barcode 11 through a reader device 3 (as shown in FIG. 5). Specifically, each of the information dots of the first two-dimensional barcode 11 is located at a central location of the 3×3 sub-modules 21.

Step S4: provide information dots containing second information for the second two-dimensional barcode 12, and each of the information dots of the second two-dimensional barcode 12 is located at one of the other sub-modules 21 of each of the module units 2. Specifically, each of the information dots of the second two-dimensional barcode 12 is located at one of the other eight sub-modules 21 of each of the module units 2 surrounding the central location of the 3×3 sub-modules.

The graphic two-dimensional barcode 1 of the present invention includes two layers of QR codes. In decryption, the first information of the first two-dimensional barcode 11 is capable of being obtained through the scanning of the reader device 3 (e.g. shooting elements of mobile electronic devices) (as shown in FIG. 5). The first information can be a link address of a website, but not limited thereto. The second information of the second two-dimensional barcode is obtained first by scanning the graphic two-dimensional barcode 1 through a shooting element (not shown) to transmit an image of the graphic two-dimensional barcode 1 to a mobile electronic device (e.g. smart phone) or a computer. Then, input a correct key through a decryption program to the mobile electronic device or the computer to obtain the second information. The decryption program is installed in the mobile electronic device or the computer, and the shooting element can be a platform-type scanner.

Figure 4:
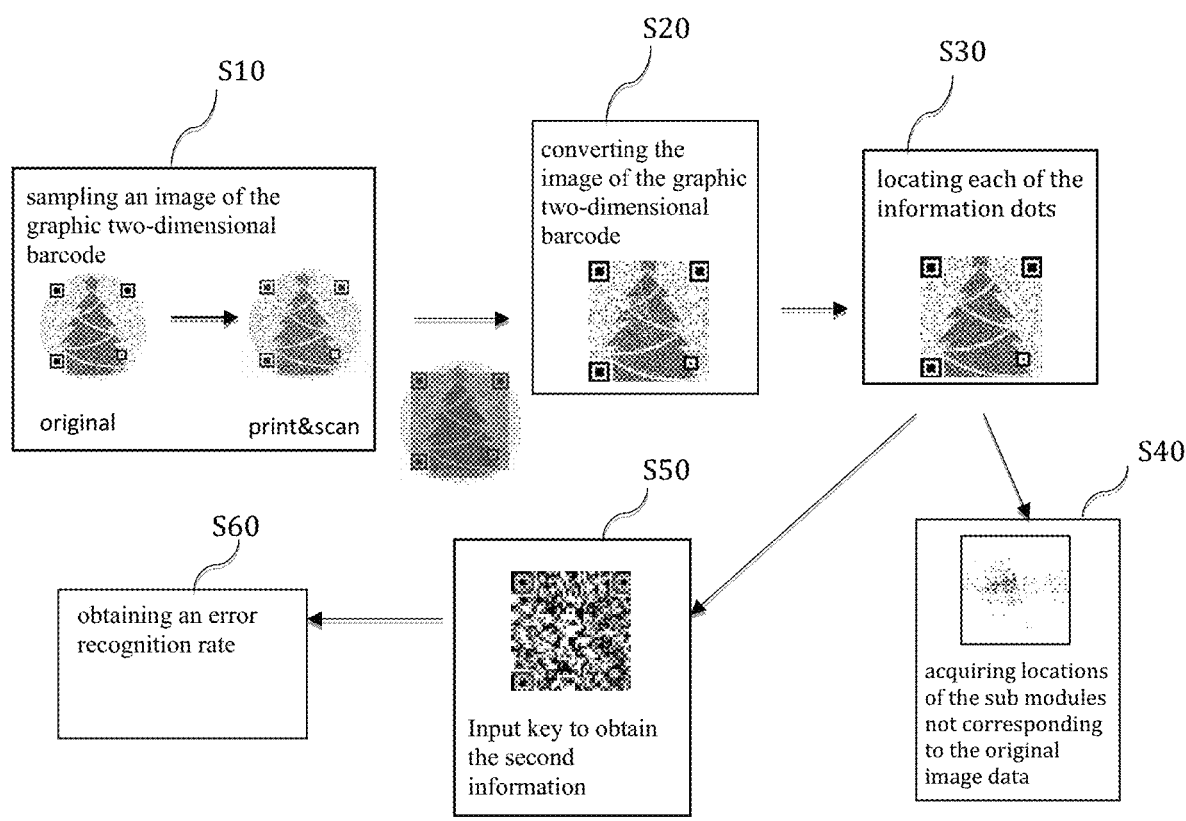
FIG. 4 is a flow chart showing how the graphic two-dimensional barcode of the present invention is decrypted.

The graphic two-dimensional barcode 1 has a structure similar to that of a general QR code. In this embodiment, the graphic two-dimensional barcode 1 includes at least three control points 13. As shown in FIG. 4, the decryption program is configured to perform steps including: step S10: sampling an image of the graphic two-dimensional barcode 1 by locating the three control points 13; step S20: converting the image of the graphic two-dimensional barcode 1 being obtained into a bi-level image; step S30: locating each of the information dots contained in the graphic two-dimensional barcode 1 by calculation, that is, locating the 123 (41×3)×123 (41×3) information dots by calculation; step S40: comparing locations of the plurality of sub-modules 21 of the module units 2 with an original image data of the graphic two-dimensional barcode 1; step S40: acquiring locations of the sub-modules 21 that are not corresponding to the original image data; and step S50: obtaining the second information upon algorithms by inputting the correct key through the decryption program.

Furthermore, the steps performed by the decryption program further includes step S60: obtaining an error recognition rate of the graphic two-dimensional barcode with respect to the original image data through the decryption processes, for fault tolerant evaluation and setting of a graphic two-dimensional barcode to be applied.

As described above, after being inputted the key, the decryption program produces a pseudo-random number having a coding sequence length to calculate the position of each of the information dots of the second two-dimensional barcode 12. In this embodiment, the pseudo-random number has the coding sequence length as long as 1681 (41×41) module units. The decryption program is performed by utilizing the pseudo-random number having the coding sequence length which is also used in the encryption by error diffusion algorithm based on the halftoning technique, and to obtain the position of each of the information dots of the second two-dimensional barcode 12, thereby to enable users to obtain the second information.

The graphic two-dimensional barcode of present invention utilizes a configuration of two-layer QR codes, in combination with an explicit cover image to effectively achieve the purpose of hiding information. The first information contained in the first two-dimensional barcode 11 can be obtained directly by a reader, and the second information contained in the second two-dimensional barcode 12 is required to be obtained with input of the key. Particularly, the information dots corresponding to the second information contained in the second two-dimensional barcode 12 are hidden and are only capable of being located by performing calculation of the pseudo-random number produced after input of the correct key. In other words, the pseudo-random number is produced to hide positions of the information dots corresponding to the second information. In this manner, the positions of the information dots being hidden are different each time after the key is input. Once the key is incorrect, the calculation of pseudo-random number is not valid, and thus the second information is unable to be obtained, thereby the hidden information is effectively protected from being illegally acquired.

Accordingly, the graphic two-dimensional barcode of the present invention utilizes two-layer QR codes in combination with an explicit cover image to achieve the purpose of hiding information and to necessitate inputting the key to obtain the second information contained in the second two-dimensional barcode. Therefore, the graphic two-dimensional barcode of the present invention is aesthetically pleasing as well as enhancing the anti-counterfeiting features, and effectively overcomes the problem of illegally use and misappropriation.

In accordance with the method of creating a graphic two-dimensional barcode of the present invention, the present invention further includes a graphic two-dimensional barcode 1, a picture 10, a first two-dimensional barcode 11, and a second two-dimensional barcode 12. The first two-dimensional barcode 11 and the second two-dimensional barcode 12 combined with the picture 10 though a halftoning technique. A plurality of module units 2 disposed on the graphic two-dimensional barcode 1, each of the plurality of module units 2 including a plurality of sub-modules 21. Information dots containing first information are disposed in the first two-dimensional barcode 11, and each of the information dots of the first two-dimensional barcode 11 is located at a central sub-module of the plurality of the sub-modules 21 of each of the module units 2. Information dots containing second information are disposed in the second two-dimensional barcode 12, and each of the information dots of the second two-dimensional barcode 12 is located at one of the other sub-modules 21 of each of the module units 2, and wherein a position of each of the information dots of the second two-dimensional barcode 12 is capable of being located by inputting a key through a decryption program, thereby to obtain the second information.

Each of the module units 2 has 3×3 of the sub-modules 21 disposed in a matrix arrangement, and each of the information dots of the first two-dimensional barcode 11 is located at a central location of the 3×3 sub-modules 21. Each of the information dots of the second two-dimensional barcode 12 is located at the other sub-modules 21 of each of the module units 2 surrounding the central location of the 3×3 sub-modules 21. Steps of performing the decryption program are clearly described in the above paragraphs and thus are not repeatedly stated herein.

It is understood that the invention may be embodied in other forms within the scope of the claims. Thus the present examples and embodiments are to be considered in all respects as illustrative, and not restrictive, of the invention defined by the claims

What is claimed is:

1. A method of creating a graphic two-dimensional barcode, comprising:
   providing a picture, a first two-dimensional barcode, and a second two-dimensional barcode;
   combining, utilizing a halftoning technique, the first two-dimensional barcode and the second two-dimensional barcode with the picture to form a graphic two-dimensional barcode including the first and second two-dimensional barcodes and the picture, the graphic two-dimensional barcode including a plurality of module units, each of the plurality of module units comprising a plurality of sub-modules;
   providing information dots containing first information for the first two-dimensional barcode, each of the information dots of the first two-dimensional barcode located at a central sub-module of the plurality of the sub-modules of each of the module units, wherein the first information is readable by scanning the information dots of the first two-dimensional barcode through a reader device; and
   providing information dots containing second information for the second two-dimensional barcode, each of the information dots of the second two-dimensional barcode located at one of the other sub-modules of each of the module units, wherein a position of each of the information dots of the second two-dimensional barcode is capable of being located by inputting a key through a decryption program for obtaining the second information.

2. The method of claim 1, wherein each of the module units has 3×3 of the sub-modules disposed in a matrix arrangement, and each of the information dots of the first two-dimensional barcode is located at a central location of the 3×3 sub-modules.

3. The method of claim 2, wherein each of the information dots of the second two-dimensional barcode is located at the other sub-modules of each of the module units surrounding the central location of the 3×3 sub-modules.

4. The method of claim 1, wherein after being inputted the key, the decryption program produces a pseudo-random number having a coding sequence length to calculate the position of each of the information dots of the second two-dimensional barcode containing the second information.

5. The method of claim 4, wherein the decryption program is performed by utilizing the pseudo-random number having the coding sequence length which is also used in encryption by error diffusion algorithm based on the halftoning technique, and to obtain the position of each of the information dots of the second two-dimensional barcode.

6. The method of claim 1, wherein the graphic two-dimensional barcode further comprises at least three control points, and the decryption program is configured to perform steps comprising:
sampling an image of the graphic two-dimensional barcode by locating the at least three control points;
converting the image being obtained into a two-level image;
locating each of the information dots contained in the graphic two-dimensional barcode by calculation;
comparing the locations of the plurality of sub-modules of the module units with an original image data of the graphic two-dimensional barcode for acquiring locations of the sub-modules that are not corresponding to the original image data; and
obtaining the second information by inputting the key through the decryption program.

7. The method of claim 1, wherein the first two-dimensional barcode and the second two-dimensional barcode are quick response (QR) codes.

8. The method of claim 1, wherein the reader device is an imaging shooting element of a mobile electronic device, and the decryption program is stored in the mobile electronic device or a computer.

9. A graphic two-dimensional barcode, comprising:
a picture, a first two-dimensional barcode, and a second two-dimensional barcode, the first two-dimensional barcode and the second two-dimensional barcode combined with the picture through a halftoning technique;
a plurality of module units disposed on the graphic two-dimensional barcode, each of the plurality of module units comprising a plurality of sub-modules;
information dots containing first information disposed in the first two-dimensional barcode, each of the information dots of the first two-dimensional barcode located at a central sub-module of the plurality of the sub-modules of each of the module units; and
information dots containing second information disposed in the second two-dimensional barcode, each of the information dots of the second two-dimensional barcode located at one of the other sub-modules of each of the module units, and wherein a position of each of the information dots of the second two-dimensional barcode is capable of being located by inputting a key through a decryption program, thereby to obtain the second information.

10. The graphic two-dimensional barcode of claim 9, wherein each of the module units has 3×3 of the sub-modules disposed in a matrix arrangement, and each of the information dots of the first two-dimensional barcode is located at a central location of the 3×3 sub-modules.

11. The graphic two-dimensional barcode of claim 10, wherein each of the information dots of the second two-dimensional barcode is located at the other sub-modules of each of the module units surrounding the central location of the 3×3 sub-modules.

12. The graphic two-dimensional barcode of claim 9, wherein the decryption program after being inputted the key produces a pseudo-random number with a coding sequence length to calculate the position of each of the information dots of the second two-dimensional barcode containing the second information.

* * * * *